A. ERICKSON.
SAW GUARD.
APPLICATION FILED JUNE 23, 1915.
1,247,247.
Patented Nov. 20, 1917.
2 SHEETS—SHEET 1.
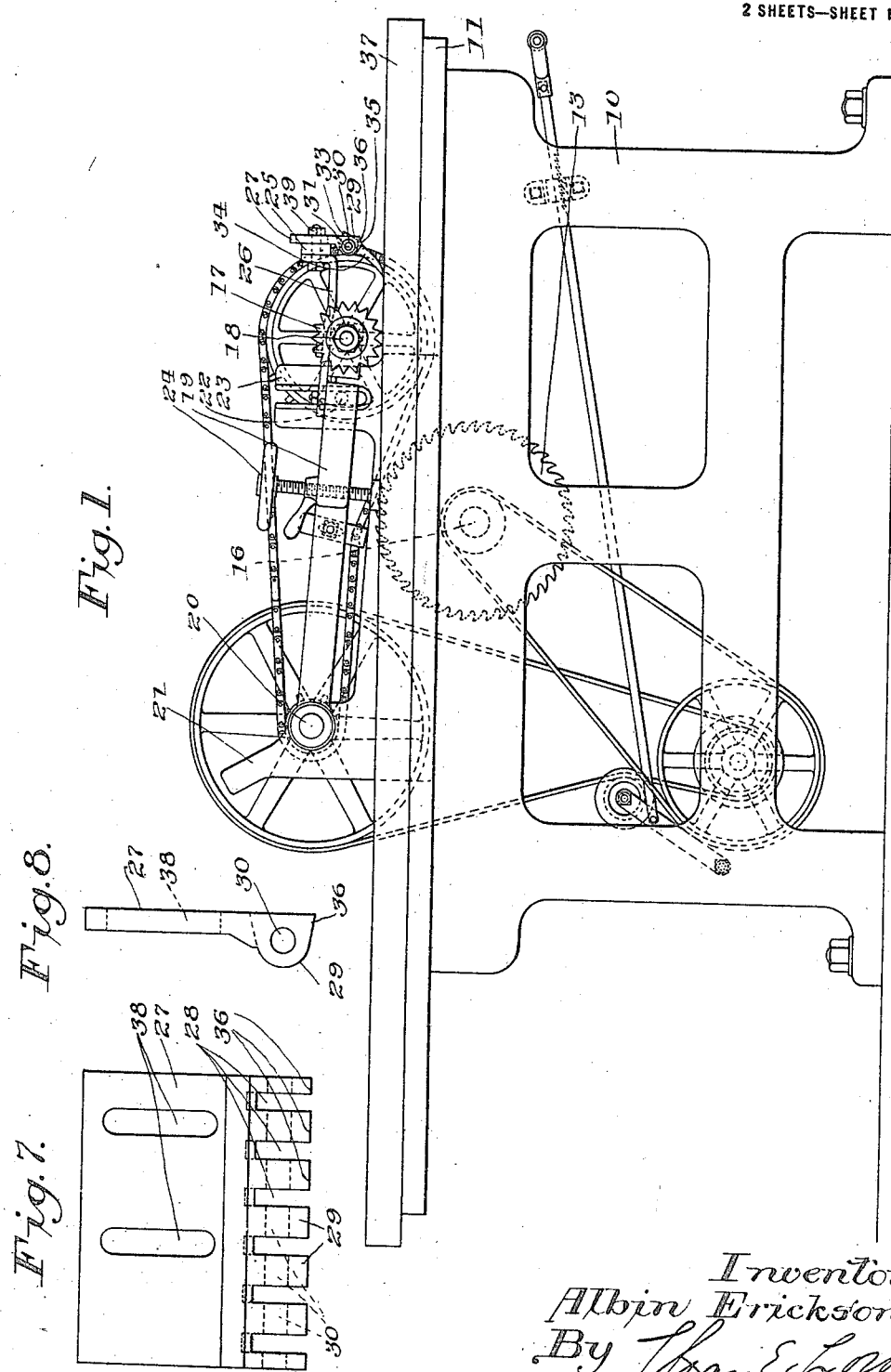
Inventor.
Albin Erickson,
By
Atty.

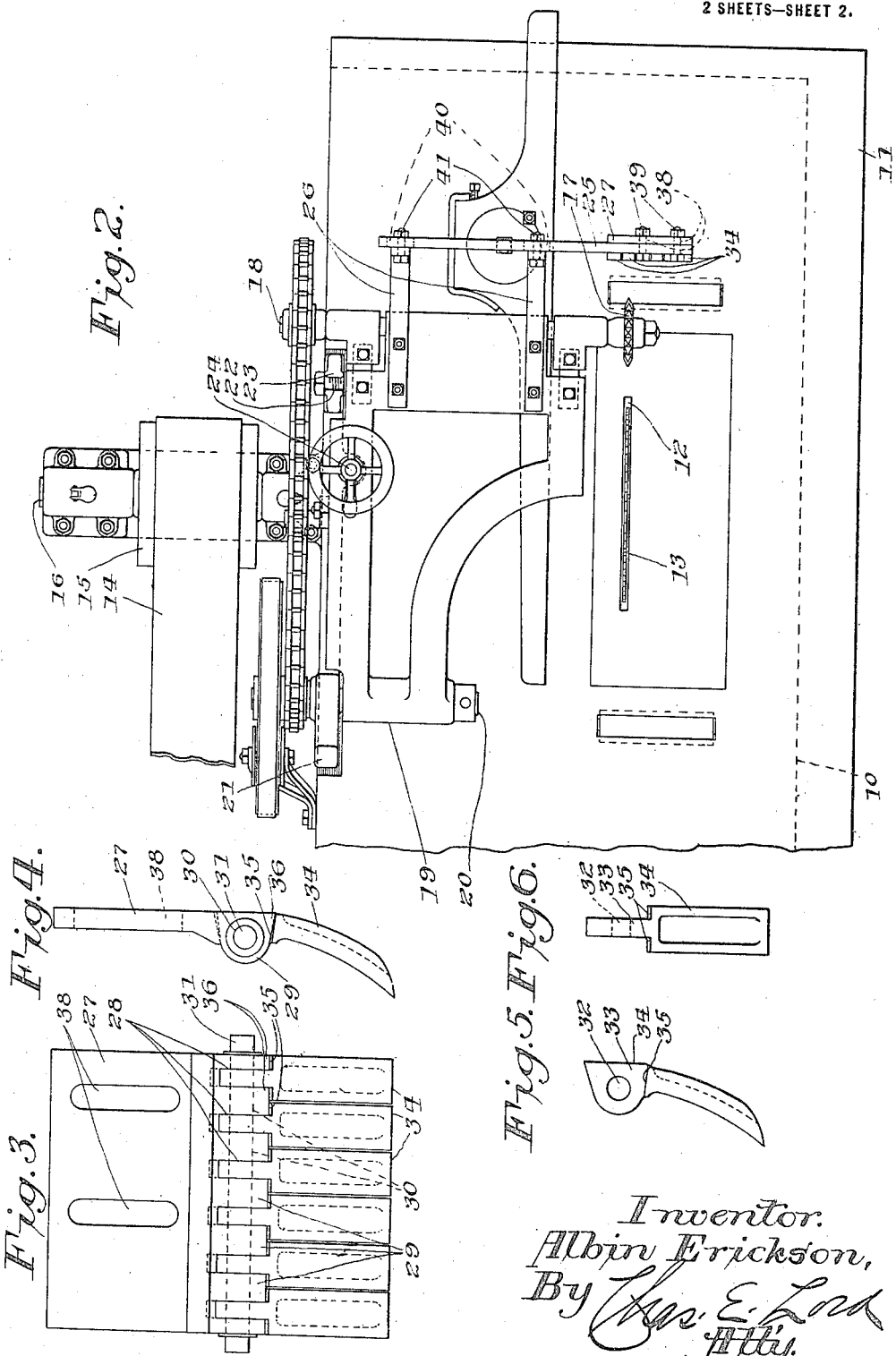

UNITED STATES PATENT OFFICE.

ALBIN ERICKSON, OF LYONS, ILLINOIS, ASSIGNOR TO INTERNATIONAL HARVESTER COMPANY OF NEW JERSEY, A CORPORATION OF NEW JERSEY.

SAW-GUARD.

1,247,247.  Specification of Letters Patent.  Patented Nov. 20, 1917.

Application filed June 23, 1915. Serial No. 35,823.

*To all whom it may concern:*

Be it known that I, ALBIN ERICKSON, a citizen of the United States, residing at Lyons, in the county of Cook and State of Illinois, have invented certain new and useful Improvements in Saw-Guards, of which the following is a full, clear, and exact specification.

The main object of my invention is to simplify and improve saw guards adapted to arrest the movement of a piece of wood kicked back by the saw.

Another object is to provide an efficient saw guard adapted to meet all of the requirements for successful commercial operation.

These and other objects are accomplished by providing a suitably supported saw guard having pivotally mounted fingers arranged for engaging a piece of wood being sawed and preventing the latter being thrown rearwardly from the table of the saw.

The invention is illustrated on the accompanying sheets of drawings, in which—

Figure 1 is a side elevation of a sawing outfit embodying my invention;

Fig. 2 is a fragmentary plan view of the same sawing outfit;

Fig. 3 is a front elevation of my improved saw guard;

Fig. 4 is a side elevation of the same;

Figs. 5 and 6 are, respectively, side and rear elevations of a detached finger forming a part of my improved saw guard; and Figs. 7 and 8 are, respectively, front and side elevations of the relatively stationary supporting part of the saw guard.

The various novel features of my invention will be apparent from the following description and drawings, and will be particularly pointed out in the appended claims.

My invention is disclosed in connection with a sawing outfit having the usual supporting base 10, upon which is mounted a table 11 having a slotted opening 12 through which a circular saw 13 projects. The saw may be driven from any suitable source by a belt 14 passing around a pulley 15 secured to a shaft 16, upon which the saw 13 is secured. This sawing outfit is provided with the usual feeding mechanism including a toothed feeding member 17 mounted on one end of a shaft 18, which may be driven through suitable chain and belt connections from any suitable source. This wood feeding mechanism includes a frame 19, which is pivotally mounted at 20 in a support 21, and is provided with a laterally extending stud 22 which operates in a suitable guiding member 23. The frame 19 and its toothed feeding member 17 may be adjusted vertically with respect to the surface of the table 11 by the usual type of screw adjusting mechanism 24.

It is well understood that in feeding a piece of strip of wood being sawed, at times, due to pinched or other conditions, the saw will exert a tremendous back pressure upon the piece of wood, thereby kicking it rearwardly with terrific force. This kicking back of a piece of wood has resulted in the death of many a person. I am aware of the fact that there are many saw guards on the market, some of which are patented, but I have provided an improved saw guard which is simple, durable, compact and efficient in operation. This saw guard is secured to a laterally extending bar 25 of metal arranged parallel with and over the table 11 and which is secured to arms 26, the latter, in turn, being securely fastened to the feeder frame 19. Mounted on one end of the metal bar 25 is my improved saw guard, which is located on the advance side of the feeding member 17 and the saw 13. This guard includes a relatively stationary supporting member 27 having a plurality of slotted portions 28 formed by depending projections 29. The depending projections are enlarged for increasing the strength thereof. These projections 29 are provided with alined openings 30 for the reception of a rod 31, which also passes through openings 32 in the upper tongue portions 33 of fingers 34 pivotally mounted on rod 31 in the slotted portions 28 between the projections 29 of main supporting member 27. The fingers 34 are provided with shoulder portions 35 which are adapted to engage tapered lower portions 36 of the projections 29 for limiting a rearward swinging movement of the fingers 34. Said fingers, however, are free to swing in a forward direction.

As shown in Fig. 1 of the drawings, a piece of wood 37 is being fed along the table under the influence of the feeder member 17 and is being acted upon by the saw 13. The piece of wood 37, in being passed under the saw guard, raises the pivotally mounted fingers 34 in a pivotal path about the rod 31, there being no action on the part of the saw guard to hinder forward feeding movement of the piece of wood 37. However, should the piece of wood be kicked rearwardly by the saw, the fingers 34 of the saw guard would immediately tend to swing backward, but being unable to do so, due to the wedging action between the piece of wood 37 and the fingers 34, the piece of wood would be arrested immediately, thereby safeguarding the operator. If the piece of wood 37, in its feeding movement, has passed out of engagement with the fingers 34 of the saw guard, said fingers will, of their own weight, swing rearwardly until the shoulders 35 thereof pass into engagement with the lower tapered portions 36 of projections 29 of the stationary member 27, which portions limit rearward swinging movement of said fingers. If, now, with the fingers in their lower position, the piece of wood is kicked back by the saw, such piece of wood would be arrested immediately upon passing into engagement with the depending fingers 34, it being understood that the latter lie in the path of movement of the wood when it is kicked rearward.

The stationary member 27 of the guard is provided with vertically arranged slots 38, by means of which the guard proper may be raised and lowered relatively to the metal bar 25 and table 11 and secured in any adjusted position by suitable bolts and nuts 39 passing through said metal bar 25 and the slots 38 in the member 27. The metal bar 25 also may be adjusted laterally, due to the fact that it is provided with slots 40, and secured in any adjusted position by bolts and nuts 41 passing through the outer ends of arms 26 and through the slots 40 in said metal bar. In this way the saw guard may be adjusted vertically and laterally with respect to the feeding mechanism and table 11 of the sawing outfit. Due to the fact that the saw guard is secured to the pivotally mounted frame 19, the saw guard also may be raised and lowered with the feeding mechanism.

It is evident that there may be various modifications in the precise form and arrangement herein shown and described, and it is my intention to cover all such modifications which do not involve a departure from the spirit and scope of my invention.

What I claim as new is:

1. A saw guard including, in combination, a vertically arranged member having depending projections with lower faces, and fingers having reduced portions being pivoted between said projections and having shoulders on opposite sides to engage the lower faces of said projections to limit backward movement of the fingers.

2. A saw guard including, in combination, a member having spaced depending portions forming a slot, one of said portions having a lower face, and a saw guard finger having a reduced portion pivoted between said depending portions and having a shoulder on a side thereof to engage said lower face to limit backward movement of the finger.

In testimony whereof I affix my signature.

ALBIN ERICKSON.

Copies of this patent may be obtained for five cents each, by addressing the "Commissioner of Patents, Washington, D. C."